J. H. SHAW.
LOCK.
APPLICATION FILED FEB. 12, 1914. RENEWED JAN. 11, 1917.

1,229,333.

Patented June 12, 1917.
5 SHEETS—SHEET 1.

WITNESSES:

INVENTOR
John H. Shaw
BY
ATTORNEY

J. H. SHAW.
LOCK.
APPLICATION FILED FEB. 12, 1914. RENEWED JAN. 11, 1917.
1,229,333.
Patented June 12, 1917.
5 SHEETS—SHEET 2.
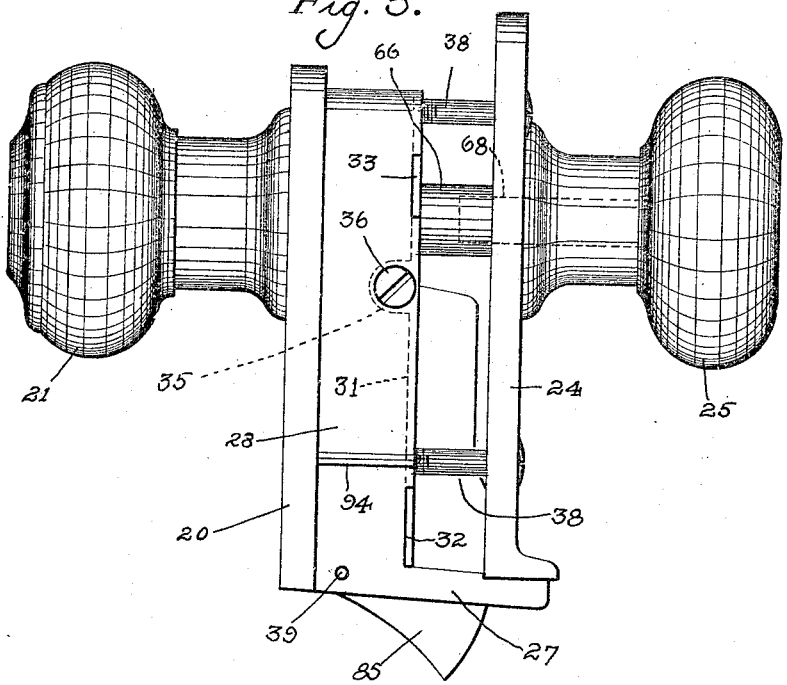
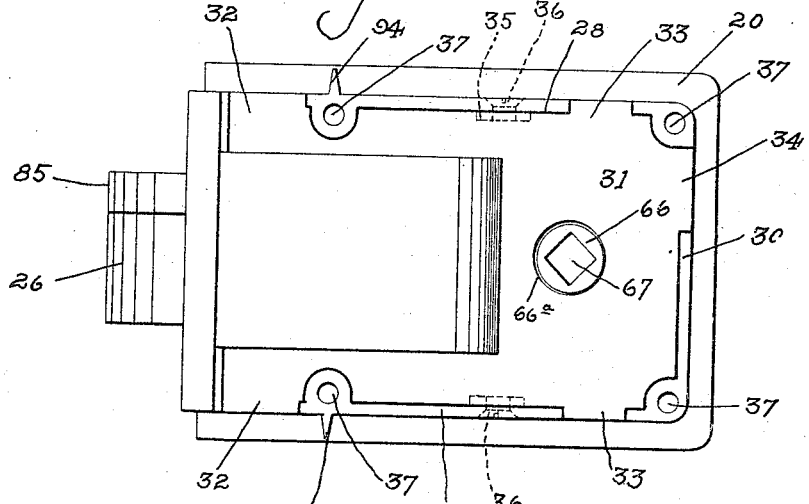
WITNESSES:
F. A. Carlson
M. O. Williams
INVENTOR
John H. Shaw
BY
ATTORNEY

J. H. SHAW.
LOCK.
APPLICATION FILED FEB. 12, 1914. RENEWED JAN. 11, 1917.

1,229,333.

Patented June 12, 1917.
5 SHEETS—SHEET 3.

WITNESSES:
F. A. Carlson
M. O. Williams

INVENTOR
John H. Shaw,
BY
ATTORNEY

J. H. SHAW.
LOCK.
APPLICATION FILED FEB. 12, 1914. RENEWED JAN. 11, 1917.
1,229,333.
Patented June 12, 1917.
5 SHEETS—SHEET 4.
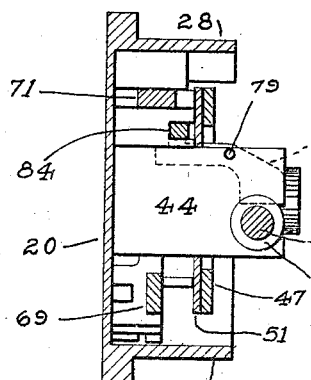
Fig. 8.
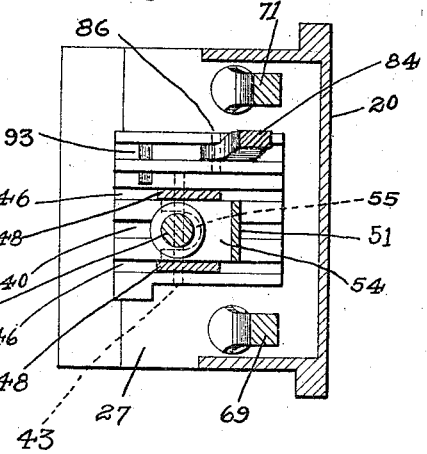
Fig. 9.
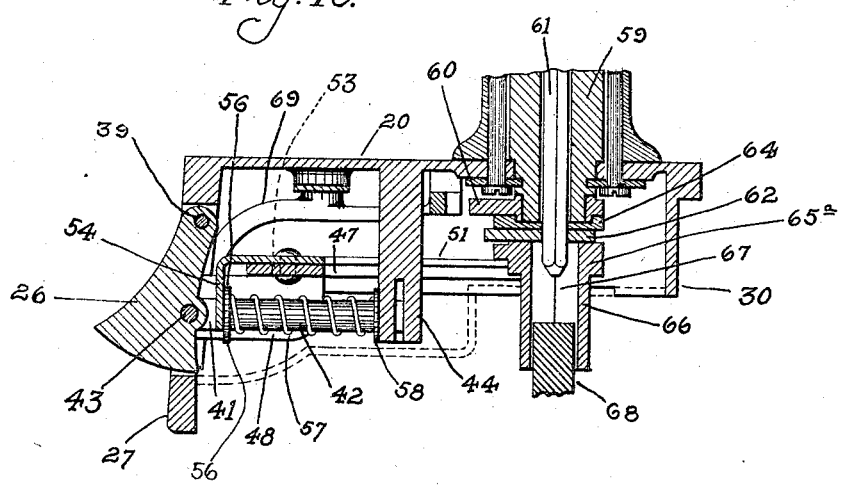
Fig. 10.
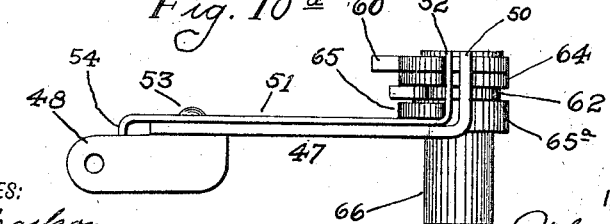
Fig. 10<sup>a</sup>.
WITNESSES:
F. A. Carlson
M. O. Williams
INVENTOR
John H. Shaw
BY
ATTORNEY J. H. SHAW.
LOCK.
APPLICATION FILED FEB. 12, 1914. RENEWED JAN. 11, 1917.
1,229,333.
Patented June 12, 1917.
5 SHEETS—SHEET 5.
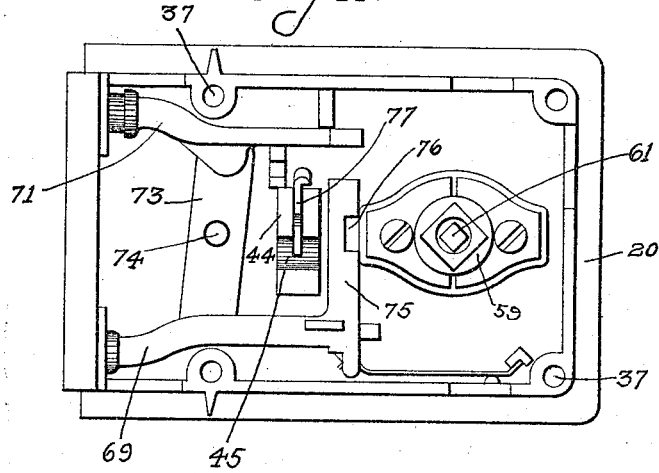
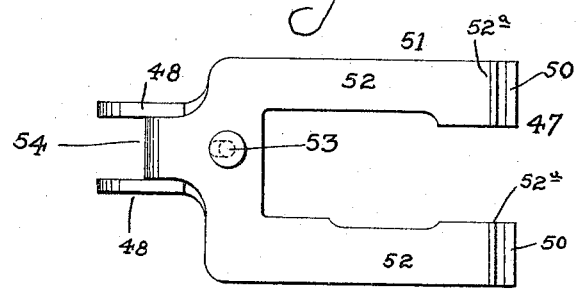
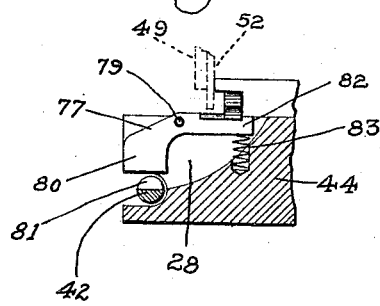
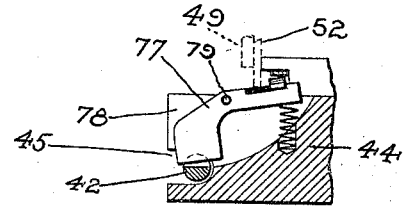
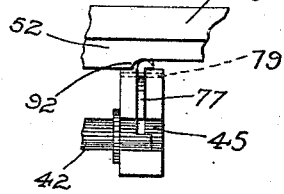
WITNESSES:
F. A. Carlson
M. O. Williams
INVENTOR
John H. Shaw
BY
ATTORNEY

UNITED STATES PATENT OFFICE.

JOHN H. SHAW, OF NEW HAVEN, CONNECTICUT, ASSIGNOR TO SARGENT & COMPANY, OF NEW HAVEN, CONNECTICUT, A CORPORATION OF CONNECTICUT.

LOCK.

1,229,333.            Specification of Letters Patent.        Patented June 12, 1917.

Application filed February 12, 1914. Serial No. 818,397. Renewed January 11, 1917. Serial No. 141,917.

*To all whom it may concern:*

Be it known that I, JOHN H. SHAW, a citizen of the United States, residing in the city and county of New Haven and State of Connecticut, have invented certain new and useful Improvements in Locks, of which the following is a full, clear, and exact description.

This invention relates to locks, and more particularly to union or escutcheon locks where the key mechanism at the outside of the door is housed in the knob for retracting the latch bolt from the outside of the door.

The primary object of the invention is to improve the general construction and operation of a lock of this type. Another object of the invention is to provide improved means for deadlocking a latch bolt automatically on the closing of the door.

To these and other ends, the invention consists in the novel features and combinations of parts to be hereinafter described and claimed.

In the accompanying drawings,

Fig. 3 is a top plan view of the lock;

Fig. 4 is an inside elevation of the outer escutcheon and the parts carried thereby;

Figure 5:
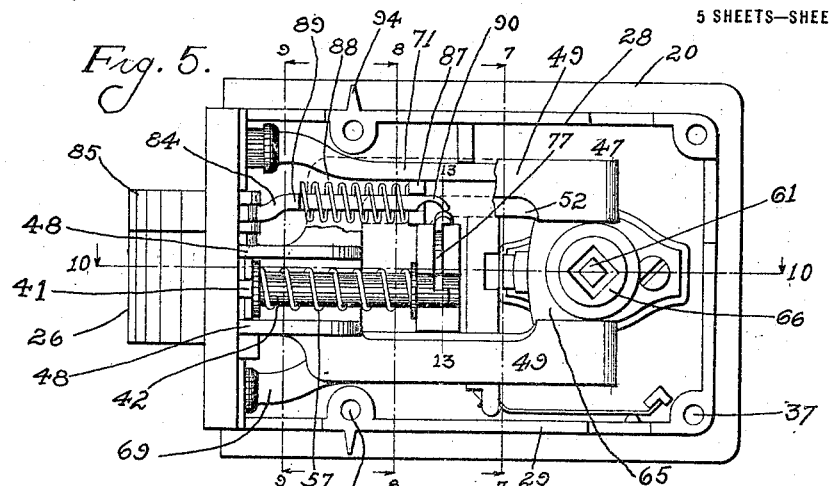
Fig. 5 is a view similar to Fig. 4 with the cover plate or back plate omitted.
Figure 6:
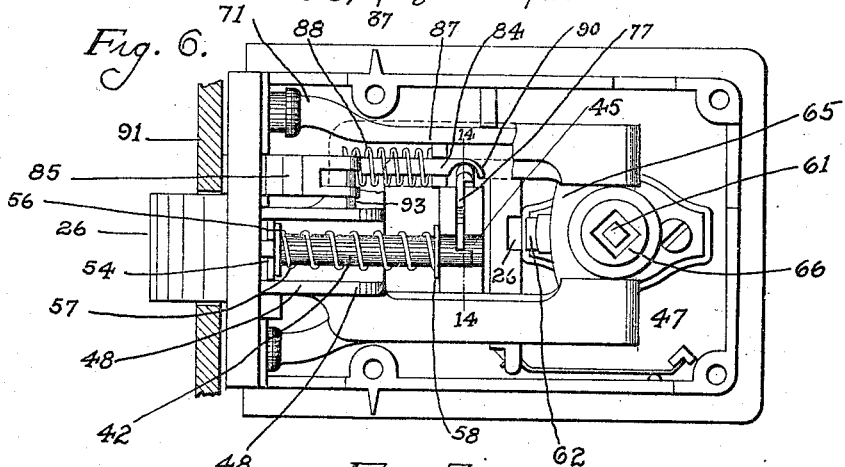
Fig. 6 is a view similar to Fig. 5 showing the positions assumed by the parts when the door is closed.
Figure 7:
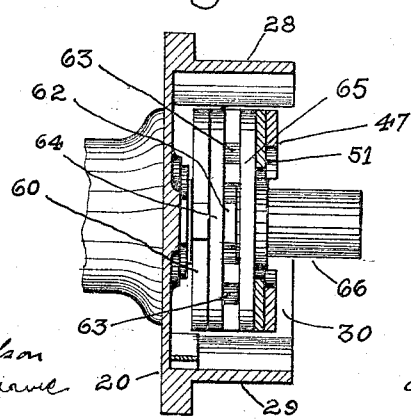

Figs. 7, 8, 9 and 10 are sections on lines 7—7, 8—8, 9—9 and 10—10 of Fig. 5;

Fig. 10ᵃ is a top plan view of the yoke showing its relation to the hubs;

Fig. 11 is a view similar to Fig. 5, with the latch bolt yoke and controller bolt omitted;

Fig. 12 is a detail of the yoke;

Fig. 13 is a fragmentary section on line 13—13 of Fig. 5;

Fig. 14 is a similar section on line 14—14 of Fig. 6; and

Fig. 15 is a detail of the yoke showing the means for releasing the deadlocking member for the latch bolt.

Referring to the drawings, the outer escutcheon 20 of the lock carries a knob 21 housing a suitable pin tumbler mechanism 22 adapted to be operated by a key 23. The inner escutcheon 24 carries a knob 25. The knob 21, pin tumbler lock 22, and knob 25 are each operatively connected with a latch bolt 26, projecting through a face plate 27 carried by the outer escutcheon 20 and extending across the inner escutcheon 24 in the manner shown in Fig. 3.

The outer escutcheon is provided near the upper edge thereof with an inwardly extending wall 28, and near its lower edge it is provided with a similar wall 29, both of which walls are joined with the upper and lower portions respectively of the face plate 27, preferably in an integral manner. An inwardly extending vertical wall 30 adjacent the rear edge of the outer escutcheon (relatively to the front or face of the lock) joins the walls 28 and 29 and forms in connection with said walls, the face plate, and the outer escutcheon, a boxlike case for the latch mechanism, which case is completed by a cover plate or back plate 31, as shown in Fig. 4. This back plate is provided at the edges with lugs 32, 33 and 34 fitting suitable notches in the inner edges of walls 28, 29 and 30, and it is also provided at the upper and lower edges with inwardly projecting lugs 35 adapted for threaded engagement with screws 36 passing through the upper and lower walls of the case, as shown in Figs. 3 and 4. The walls 28, 29 and 30 of the case are provided with threaded sockets 37 adapted to receive the inner threaded ends of screws 38 passing through the inner escutcheon 24, whereby the inner escutcheon may be secured to the outer escutcheon and adjusted relatively thereto in order to adapt the lock to doors of different thickness.

The latch bolt 26 is of the car latch type, being pivoted to the face plate 27 by means of a pin 39. At the rear face of the latch bolt, the same is provided with a groove 40 into which extends the flattened forward extremity 41 of a latch bolt stem or spindle 42, which is pivoted to the latch bolt by a pin 43 extending through the part 41, as shown in Figs. 9 and 10. The rear extremity of the stem or spindle 42 is guided in a post or standard 44 projecting inward from the outer escutcheon 20, as shown in Fig. 10, said standard or post being provided with a notch 45 in which the stem or spindle 42 is retained by the back plate 31.

Above and below the groove 40 in the latch bolt are grooves 46, in which a yoke member 47 is pivoted by the same pin 43 which pivots the stem or spindle 42 to the latch bolt. The yoke member 47 is pivoted to the pin 43 by webs 48 entering the respective grooves 46. Extending rearwardly from the webs 48 are arms or branches 49 which give the yoke member 47 the shape of a fork. The rear extremity of each arm 49 is provided with an inturned wing 50. Another yoke member 51, having arms or branches 52 lying against and parallel to the arms 49 of the yoke member 47 is slidably connected with the last named yoke member by a pin and slot connection 53, as shown in Fig. 12. Pivotal movement of the part 51 relative to the part 47 is prevented by providing the former part with an upturned forward end portion or lug 54, which fits between and in engagement with the webs 48, as shown particularly in Figs. 10 and 12. The lug 54 on part 51 is constructed in the shape of a fork, being provided with a notch 55 engaging the stem 42, as shown in Figs. 9 and 10. A washer 56 surrounding the stem 42, and abutting the lug 54 forms an abutment for the latch bolt spring 57 which is coiled about the stem 42 and reacts at its rear extremity against a washer 58 positioned against the front face of the post or standard 44 (relative to the front or face of the lock). In this manner the spring 57 normally holds the latch bolt in its protracted position.

The outside knob 21 is provided with a spindle 59 rotatably secured in the outer escutcheon by suitable means, as shown in Fig. 10, and provided at its inner end with a hub 60. The key mechanism 22 comprises a key rod 61 extending through the spindle 59, and carrying at its inner end a dog 62 adapted to abut either of two pins 63 on a hub or rollback 64, whereby said hub or rollback may be operated by the key mechanism. The hubs 60 and 64 are nested together in the manner shown in Fig. 10. A third hub 65 is arranged in line with the hubs 60 and 64, and is provided with a sleeve 66 having a polygonal opening 67 fitting telescopically a spindle 68 rigid with the inner knob 25. By this construction, the inner knob can operate the hub 65 irrespective of the adjustment of the escutcheon 24 relative to the latch mechanism, within certain limits, as the lock is adjusted to doors of different thickness. The sleeve 66 of the hub 65 passes through an opening 66ª in the back plate 31, which back plate in overlying a shoulder 65ª on the hub 65 at a point within the casing holds said hub in position relatively to the other hubs.

The rear extremities of the arms 52 of the yoke member 51 are provided with inturned wings 52ª adjacent the wings of the several hubs and interposed between said hubs and the wings of the yoke member 47, as shown in Fig. 10ª. In the normal position of the parts, there is a slight amount of play between the wings 52ª and the corresponding wings 50 of the respective yoke members. Hence, when any one of the hubs 60, 64, 65 is turned by its operating member, the yoke member 51 will be moved rearwardly independently of the yoke member 57 until the wings 52ª abut the corresponding wings 50, whereupon both yoke members will move rearwardly together, the latch bolt 25 being thereby retracted by virtue of its connection with the yoke member 47. In retracting the latch bolt, the spring 57 is compressed, the stem 42 being guided rectilinearly in the standard 44, so that the latch bolt head is firmly guided and supported in its inward movement. When the hub in question is released, the latch bolt is protracted again in an obvious manner.

The outside hub 60 may be dogged and released by appropriate night latch mechanism which, in the form shown, comprises a dogging slide 69 having a plunger head or button 70, accessible at the face of the lock, a releasing slide 71 having a plunger head or button 72 accessible at the face of the lock, and a walking beam 73, pivoted in the case at 74 and connecting said slides in the well known manner. The dogging slide 69 is provided with an arm 75, having a notch 76 adapted to take over the projection or lug 77 on the hub 60, and to thereby dog said hub against movement, likewise the knob 21 connected therewith. This knob may be released by pushing in the releasing slide 71.

Turning, now, to the mechanism for deadlocking the latch bolt, I employ a deadlocking member coöperating with the rear extremity of the latch bolt stem 42, and preferably comprising a lever 77 pivoted in a kerf or notch 78 in the standard or post 44. The deadlocking lever 77 is pivoted intermediate of its ends on a pivot 79, and one end 80 of said lever is adapted to coöperate with the locking surface 81 on the rear end of the bolt stem. The other end 82 of the lever 77 is acted on by a spring 83 which normally pushes the end 80 into the path of the latch bolt stem, as shown in Fig. 14. The deadlocking lever is controlled in its operation by the shank 84 of a controller bolt 85. The controller bolt is preferably pivoted on the same pin 39 which forms the pivot for the latch bolt, and the shank 84 is pivoted to the bolt 85 by a pin 86, as shown in Fig. 9. The shank 84 is guided in the case near the rear end of said shank in a bifurcated lug 87, and a spring 88 coiled about the shank 84 between the lug 87 and a suitable abutment or enlargement 89 on the shank normally holds the controller bolt in its protracted position. The shank 84 is provided with a notched rear extremity 90, which, when the parts are in the normal position shown in Fig. 5, engages and presses downward the end 82 of the deadlocking lever 77, as shown in Fig. 13, whereby said lever is held in an inoperative position with respect to the latch bolt. When, however, the door is closed, the controller bolt is held in its innermost position by contact with the strike 91, as shown in Fig. 6, in which position the notch in the rear extremity 90 of the shank 84 is in line with the lever 77, so that the spring 83 moves the deadlocking lever into the path of the latch bolt stem, as shown in Fig. 14. Hence in this position of the parts, it is impossible to push back the latch bolt by an instrument inserted between the lock front and the strike. When the parts are in the locked position, shown in Fig. 6, the latch bolt may be retracted by any one of the hubs 60, 64, 65, except in the case where the hub 60 is dogged by the stop work, in which event, the operation of the latch will be confined to the key mechanism at the outside of the door and to the inside knob operating their respective hubs. The hub which is used for retracting the latch bolt first shifts the yoke member 51 before the yoke member 47 and latch bolt 25 begin to move, as previously explained. In doing this, a shoulder 92 on the member 51, contacts with the extremity 82 of the deadlocking lever 77, and moves it out of deadlocking position so that when the yoke member 47 begins to move the latch bolt is free for retraction.

The controller bolt 85 is provided at its rear surface with a pin 93 extending down into the path of the latch bolt, so that in case both bolts are protracted, the controller bolt will be retracted by the incursion of the latch bolt.

Figure 1:
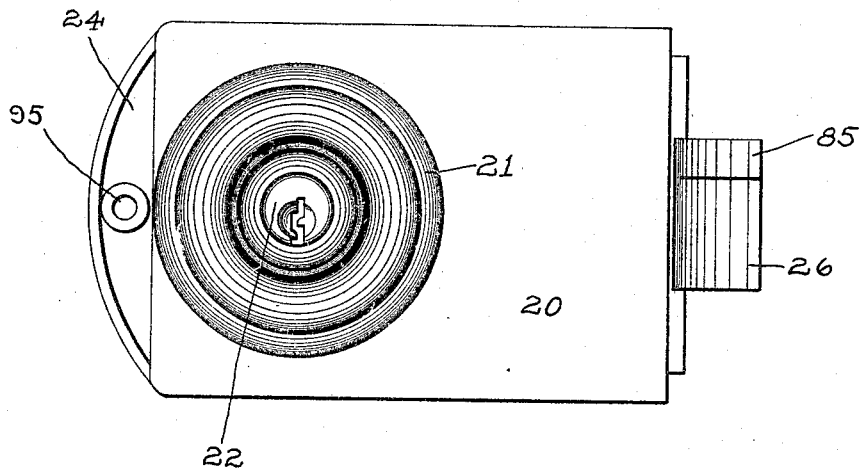
Figure 1 is an elevation of a lock embodying my improvements looking toward the outside escutcheon.
Figure 2:
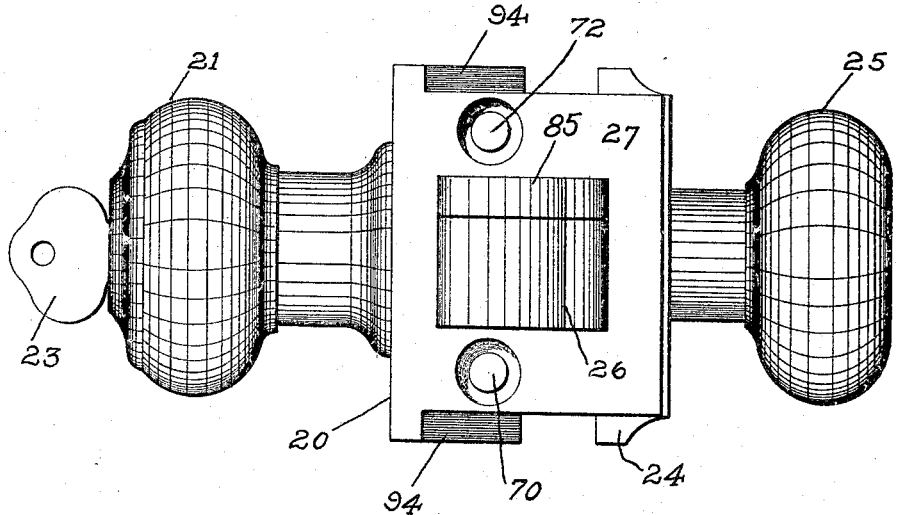
Fig. 2 is an edge view of the lock looking toward the face plate or front.

In applying the lock to a door, the stile of the door is suitably notched to receive the casing containing the latch mechanism, after which the escutcheons are applied from the proper sides of the doors and connected by the screws 38. The upper and lower walls 28 and 29 of the case are provided with transverse fins 94, so that when the outer escutcheon and the parts carried thereby are set into the notch from the face of the door, the fins 94 may be driven into the upper and lower edges of the notch in such a manner as to prevent the displacement of the lock in a direction toward the edge of the door. Moreover, the inner escutcheon 24 is extended back of the outer escutcheon 20 with reference to the edge of the door, as shown in Figs. 1 and 3, and is provided with an opening 95 for a suitable screw, so that the inner escutcheon may be screwed to the uncut part of the door at the inside of the latter. This also prevents movement of the lock toward the edge of the door, and as the escutcheons are tightly clamped on the portions of the door adjacent the edges of the notch, by means of the screws 38, the lock may be securely held in place.

Without limiting myself to the construction shown, I claim:

1. In a lock, the combination of a pair of escutcheons, a knob carried by each escutcheon, a face plate carried by one of said escutcheons, inwardly projecting walls formed integral with said escutcheon and constituting, in conjunction with said escutcheon and with said face plate, a casing, said casing being of less depth from the edge of the door than the other escutcheon, said other escutcheon being extended horizontally back of said casing, and provided at that point with an opening for a screw to engage the material of the door, a latch bolt projecting through said face plate, retracting mechanism for said bolt housed in said casing, and including hubs operatively connected with the respective knobs, and a third hub, a lock in one of the knobs operatively connected with said third hub, a cover plate for said casing located between said escutcheons and overlying said hubs to hold them in place in said casing, and means for securing said cover plate in position; substantially as described.

2. In a lock, the combination of a pair of escutcheons, a knob carried by each escutcheon, a face plate carried by one of said escutcheons, inwardly projecting walls formed integral with said escutcheon and constituting, in conjunction with said escutcheon and with said face plate, a casing to partially house a latch-retracting mechanism, said walls formed with integral screw sockets, screws engaging said sockets, and the other escutcheon, and providing for the adjustable interconnection of the escutcheons, a latch bolt projecting through said face plate, latch-retracting mechanism in said casing, including hubs operatively connected with the respective knobs, and a third hub, a lock in one of said knobs operatively connected with said third hub, a cover plate for said casing overlying said hubs to hold them in position in said casing, and means for securing said cover plate in position; substantially as described.

3. In a lock, the combination of a pair of escutcheons, a knob carried by each escutcheon, a face plate carried by one of said escutcheons, inwardly projecting walls formed integral with said escutcheon and constituting, in conjunction with said escutcheon and with said face plate, a casing to partially house a latch-retracting mechanism, said casing of less depth from the edge of the door than the other escutcheon, said other escutcheon being extended horizontally back of said casing, and provided with an opening at that point for a screw to engage the material of the door, the walls of said casing having screw sockets associated therewith, screws engaging said sockets and the other escutcheon, and providing for the adjustable interconnection of the escutcheons, a latch bolt projecting through said face plate, latch-retracting mechanism in said casing, including hubs operatively connected with the respective knobs, and a third hub, a lock in one of said knobs operatively connected with said third hub, and a cover plate for said casing overlying said hubs, and confining the latter in said casing; substantially as described.

4. In a lock of the union type, the combination of a side plate, a latch bolt, a latch bolt stem, a cover plate, and a bracket on said side plate, guiding said stem and supporting said cover plate.

5. In a lock of the union type, the combination of a side plate, a face plate, a latch bolt projecting through the face plate, a standard projecting inward from the side plate, a rod guided in the standard and connected with said latch bolt, a spring interposed between the latch bolt and the standard, and means for retracting the bolt.

6. In a lock, the combination of a pivoted latch bolt, a plurality of hubs, a device tending to deadlock said latch bolt, and a yoke connected with said latch bolt and coöperating with said hubs and comprising two individually movable parts, one of which is adapted to engage and operate said deadlocking device prior to the retraction of the latch bolt, the parts of said yoke having a pin and slot connection between them, and one of said parts being engaged with the other to prevent relative turning movement; substantially as described.

7. In a lock, the combination of a pair of escutcheons, a knob carried by each escutcheon, a face plate carried by one of said escutcheons, inwardly projecting walls formed integral with said escutcheons, and constituting, in conjunction with said escutcheon and with said face plate, a casing to partially house a latch-retracting mechanism, said casing being of less depth from the edge of the door than the other escutcheon, and having screw sockets integral with the walls thereof, screws engaging said sockets and the other escutcheon, and providing for the adjustable interconnection of said escutcheons, a pivoted latch bolt carried by a face plate, a stem or spindle pivoted to said bolt, a post or standard projecting from the escutcheon carrying said casing, within said casing, and forming a guide for said stem or spindle, retracting mechanism for said latch bolt located in said casing, and including hubs operatively connected with the respective knobs, a cover plate for said casing to hold said hubs in place, a deadlocking lever associated with said post or standard, and adapted to coöperate with the rear portion of said stem to block the incursion of the bolt, and means for controlling the operation of said deadlocking lever; substantially as described.

8. In a lock, the combination of a pivoted latch bolt, a spring pressed stem or spindle pivoted thereto, means for guiding said spindle rectilinearly, guarding mechanism for said latch bolt including a device tending to deadlock said spindle, a yoke pivoted to said latch bolt and including two parts relatively slidable with respect to each other, one of said parts being arranged to release the latch guarding mechanism prior to the retraction of the bolt, and a plurality of hubs coöperating directly with the last named part of said yoke; substantially as described.

9. In a lock, a pivoted latch bolt, a stem pivoted to said latch bolt, a post or standard in which said stem is guided, and deadlocking means for said latch bolt associated with said standard and coöperating directly with said stem; substantially as described.

10. In a lock, a pair of escutcheons, a face plate carried by one of said escutcheons, a pivoted latch bolt projecting through the face plate, a post or standard projecting inwardly from one of said escutcheons, a stem pivoted to said latch bolt, and guided in said post or standard, said post or standard having a kerf therein, a deadlocking lever mounted in said kerf and coöperating with the rear extremity of said stem, means for controlling said deadlocking lever, and means for retracting said latch bolt; substantially as described.

In witness whereof, I have hereunto set my hand on the 10th day of February, 1914.

JOHN H. SHAW.

Witnesses:
CURTIS P. WILLIAMS,
BERTHA RAY.

Copies of this patent may be obtained for five cents each, by addressing the "Commissioner of Patents, Washington, D. C."